F. J. ANTELOTTI.
DEVICE FOR HOLDING SOFT COLLARS.
APPLICATION FILED SEPT. 5, 1919.
1,363,381.
Patented Dec. 28, 1920.
2 SHEETS—SHEET 1.
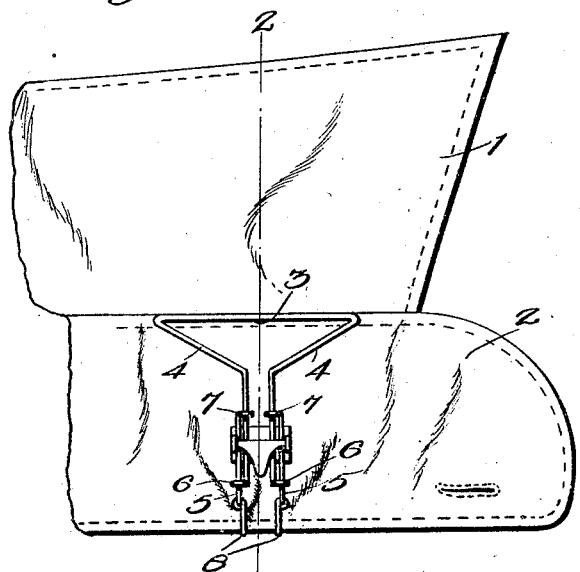
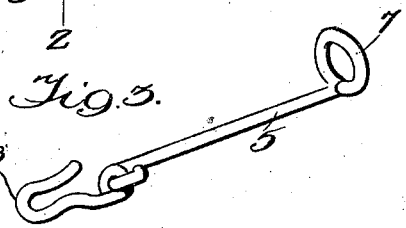
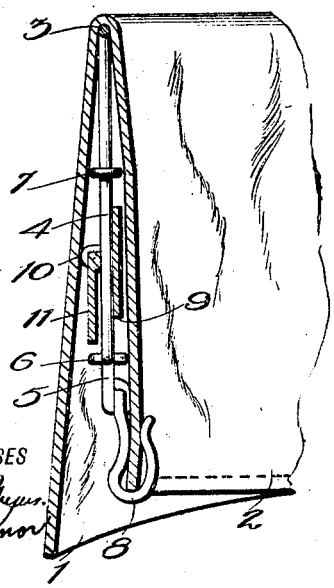
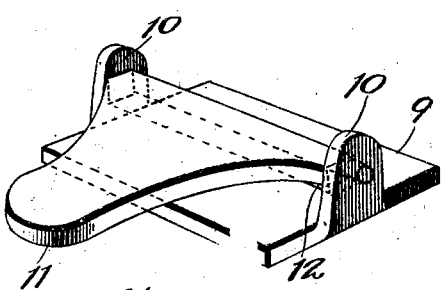
WITNESSES
INVENTOR
F. J. ANTELOTTI,
BY
ATTORNEYS F. J. ANTELOTTI.
DEVICE FOR HOLDING SOFT COLLARS.
APPLICATION FILED SEPT. 5, 1919.
1,363,381.
Patented Dec. 28, 1920.
2 SHEETS—SHEET 2.
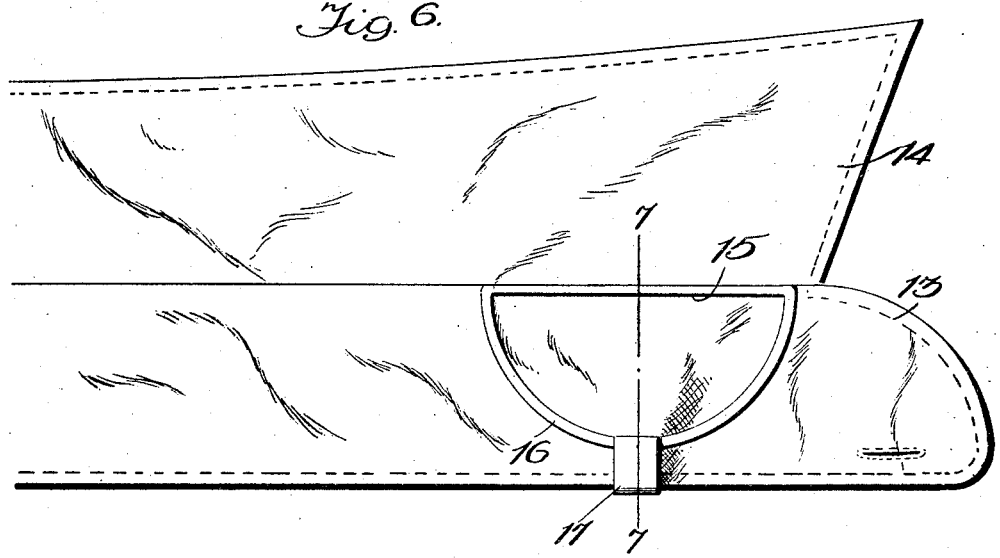
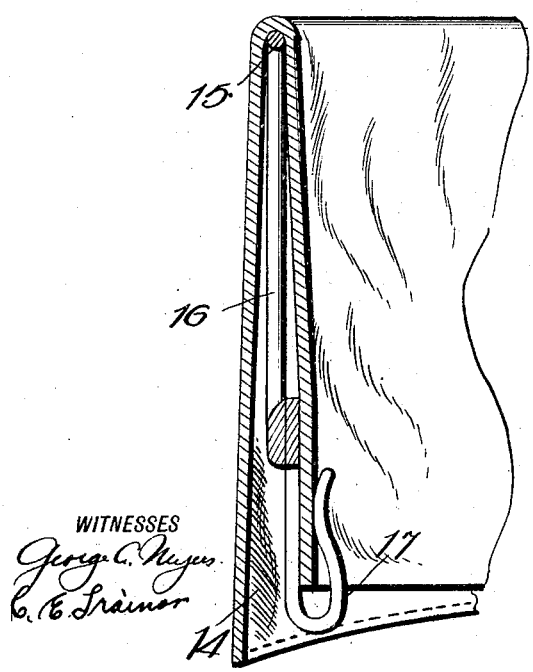
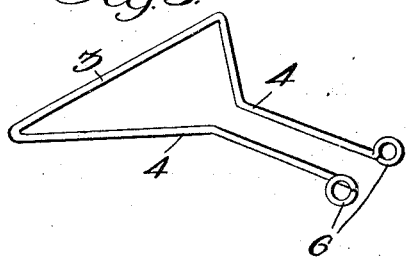
WITNESSES
INVENTOR
F. J. ANTELOTTI,
BY
ATTORNEYS

UNITED STATES PATENT OFFICE.

FRANK J. ANTELOTTI, OF NORFOLK, VIRGINIA.

DEVICE FOR HOLDING SOFT COLLARS.

1,363,381. Specification of Letters Patent. Patented Dec. 28, 1920.

Application filed September 5, 1919. Serial No. 321,779.

*To all whom it may concern:*

Be it known that I, FRANK J. ANTELOTTI, a citizen of the United States, and a resident of Norfolk, in the county of Norfolk and State of Virginia, have made certain new and useful Improvements in Devices for Holding Soft Collars, of which the following is a specification.

My invention is an improvement in devices for supporting and holding soft collars erect, and the invention has for its object to provide a device of the character specified capable of being attached to soft collars or removed therefrom, and of sufficient rigidity to hold the collar erect under all conditions and also one wherein the device may be adjusted to permit use with collars of various heights.

In the drawings:—

Figure 1 is a view looking from the inside of a soft collar with the improvement in place;

Fig. 2 is a vertical section through the collar;

Fig. 3 is a perspective view of one of the lower arm sections;

Fig. 4 is a similar view of the clamp;

Fig. 5 is a perspective view of the upper section of the device;

Fig. 6 is a view similar to Fig. 1 showing a modified construction;

Fig. 7 is a section on the line 7—7 of Fig. 6.

In the embodiment of the invention shown in Figs. 1 to 5, inclusive, the device is a substantially yoke shaped member adapted to be arranged between the outer fold 1 and the stand or inner fold 2 of the soft fold collar and adapted to embrace and grip the lower edge of the stand or inner fold and the connection between the folds. The device is sectional and the sections are adjustable with respect to each other so that it may be used with collars of varying heights.

The device is a substantially yoke shaped member consisting of a supporting end or body 3 and sectional arms 4—5. The portion 4 of each arm consists of two parts extending at an obtuse angle with respect to each other, those parts adjacent to the body converging, while those parts remote from the body are substantially parallel and are provided with outwardly extending eyes 6 at their ends. The sections 5 of each arm have laterally extending eyes 7 at one end and a resilient gripping hook 8 at the other, each of the hooks being pivoted to the arm section as shown in Fig. 3. The body 3 and the arms 4—5 of the yoke are of round material, as for instance wire of suitable gage, while the hooks 8 are of flat material, as shown.

The eyes 7 of each of the sections 5 slidably engage the parallel portion of the adjacent arm 4 and the eyes 6 of each arm 4 engage the adjacent section 5 of the arm. Thus the sections of each arm are slidably connected and they are held in adjusted position by means of the clamp shown in Fig. 4.

The said clamp comprises a plate 9 having at its sides laterally extending lugs 10. A lever 11 is pivoted between these lugs, the lever having an angular portion 12, which is adapted to engage closely the sections 4—5 of the arms which lie side by side and in the same plane when the lever is substantially parallel with the plate 9 and to release said arm sections when the lever 11 is turned at an angle to the said plate.

The arm sections are passed between the plate and the lever as clearly shown in Fig. 2, and it is evident that by means of the clamp the arm sections may be adjusted to any desired position and may then be held firmly in such adjusted position.

In use the device is arranged as shown in Figs. 1 and 2, between the folds of the collar, with the hooks 8 embracing and gripping the lower edge of the inner fold or stand 2, and with the upper end of body 3 of the yoke engaging the connections between the folds 1 and 2. One of the devices is arranged within each end of the collar near the front button-hole as shown, as these are the points where the collar first begins to wrinkle or droop.

By means of the clamp and making the same in adjustable sections the device may be adjusted to fit a collar of any height, and when the collar is removed, it is not necessary to remove the devices, as they may be left in place until the collar is again worn. When the collar is to be laundried, the devices are removed and applied to another collar.

The embodiment of the invention shown in Figs. 6 and 7 is shown in connection with a collar having the stand or inner fold 13 and the outer fold 14. The device comprises a body portion frame of substantially wedge shaped form consisting of a straight upper supporting end 15 and curved sides 16. A resilient hook 17 projects downwardly from about the center of the curved portion, being either integral or connected thereto in any suitable manner, as for instance, by soldering or brazing, and it will be noticed that the said curved portion is flattened at the point of connection with the hook.

While the frame may be of round wire, the hook is of strip material, so that it will be resilient and obtain a wide and firm grasp on the collar edge engaging the same from below. The hook is engaged with the collar edge as shown in Fig. 7 in use, with the body 15 of the frame extending along the connection between the two folds of the collar, and it will be obvious that the device will properly support the collar when in use. The new devices permit the celluloid plates in use to be dispensed with, and do not require any pockets in the collar.

The hooks 8 and 17 are resilient clasps which firmly grasp the edge of the inner fold of the collar. These hooks are sufficiently resilient and the bill is sufficiently close to the body of the hook to provide a clasping action, yet they may be applied to and removed from collars without tearing, ripping, or in any manner damaging them. It will be understood that while the hooks 8 and 17 are shown as of strip material, they may be of round material, that is, wire like the remainder of the device.

I claim:

1. In a device of the class described, a collar support adapted to lie within the fold of a turn-down collar adjacent the meeting ends of the collar and to the side of the front fastening of the collar, said support having a substantially triangular outline, a resilient hook clasp depending from the lower end of the support and adapted to engage under and with the lower end of the band of the collar, the upper end consisting of a broad bearing surface to lie beneath the fold of the collar and support the same in upright condition.

2. A support for collars adapted to lie within the fold of a turndown collar at each side of the front collar fastening, said support having at its lower end a resilient hook adapted to embrace and tightly clasp the stand of the collar at its lower end, said support having outwardly and upwardly flaring portions, disposed symmetrically with respect to the said hook and connected at their upper ends to form a broad bearing surface to lie beneath the fold of the collar, and support the same in upright condition.

3. A support for collars adapted to lie between the stand and the outer fold of the collar adjacent the front ends of the collar and at the sides of the front button-holes thereof, said support comprising upper and lower sections slidably connected with each for vertical adjustment, means for locking the said sections together in their various degrees of adjustment, the upper section having an extended upper edge to lie within the bend of the collar, and a resilient open hook clasp at the lower end of the lower section, adapted to embrace the lower end of the collar stand, and firmly grip the opposite faces thereof.

FRANK J. ANTELOTTI.